W. R. THOMSON.
SPOT WELDING.
APPLICATION FILED JULY 9, 1917.

1,305,503.

Patented June 3, 1919.

WITNESSES
E. W. Callaghan
C. L. Schmidt

INVENTOR
WADDY R. THOMSON,
BY
ATTORNEYS

UNITED STATES PATENT OFFICE.

WADDY RANDOLPH THOMSON, OF LANCASTER, SOUTH CAROLINA.

SPOT-WELDING.

1,305,503.      Specification of Letters Patent.      Patented June 3, 1919.

Application filed July 9, 1917. Serial No. 179,377.

*To all whom it may concern:*

Be it known that I, WADDY R. THOMSON, a citizen of the United States, and a resident of Lancaster, in the county of Lancaster and State of South Carolina, have invented new and useful Improvements in Spot-Welding, of which the following is a specification.

My invention is an improvement in spot welding, and has for its object to provide a method of splicing steel bale strapping and the like to permit the reuse of the pieces of strapping by converting the small pieces into a continuous piece of proper length and tensile strength.

As is known, in packing bales of cotton, cloth, burlap and the like, it is customary to strap such bales after they have been pressed to the proper size with steel strapping. When the bales pass into consumption it is customary to cut the strapping, thus making two pieces, each of which is shorter than the original length required to pass about the bale and hold it in its pressed condition.

As is also known, riveting these pieces together is unsatisfactory for the reason that it is impossible to rivet the two pieces without making a thickness, including the rivet heads, of approximately five times the bulk of a single thickness of strapping. Owing to the strapping in practical use being passed through small slots and coming in contact with the rough material used in covering the bales this additional thickness and the protruding heads are objectionable.

Also, in riveting two pieces of strapping together the ends extending beyond the rivet are liable to turn up, thus making it difficult for reuse and dangerous if sharp edges or twisted laps are left exposed. Furthermore, the rivets being of soft material pull out under strain and since it is impossible to place more than one rivet across the width of the strapping owing to its being narrow, when more than one rivet is required, additional lap edge surface must be provided.

In the present embodiment of the invention, the ends are lapped upon each other, or are abutted and lapped upon another piece of the same material, and the ends and the pieces are spot welded in such manner that practically the whole width of the strapping is connected.

Figure 1:
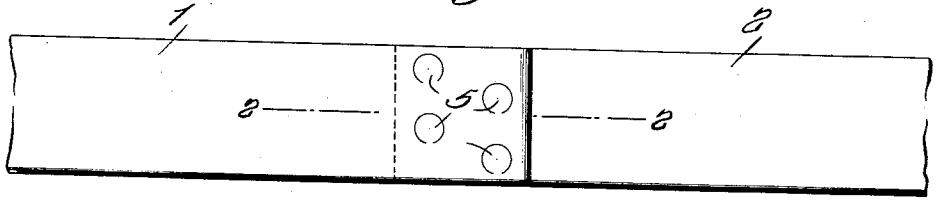
Figure 1 is a top plan view of one form of splice.
Figure 2:
Fig. 2 is a section on the line 2—2 of Fig. 1.

In the embodiment of the invention shown in Figs. 1 and 2, the pieces 1 and 2 to be connected have their ends turned over, as indicated at 3 and 4, respectively, to form hooks, and the hooks are engaged with each other in the manner shown, the four thicknesses of material being pressed tightly together and spot welded, as indicated at 5. It will be noticed that the weld spots are so arranged that practically the entire width of the strapping is welded. Two series of welds are provided, the series being spaced apart longitudinally of the strapping and the members of each series being spaced apart laterally and staggered with respect to the members of the other series.

Figure 3:
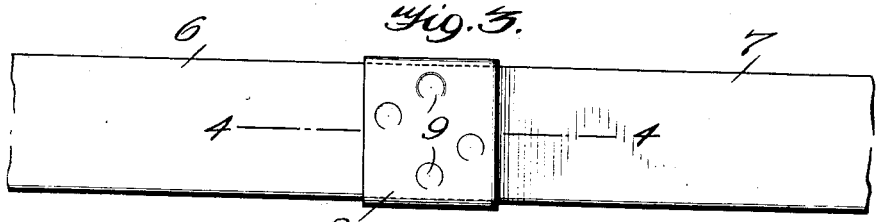
Fig. 3 is a top plan view of another form of splice.
Figure 4:
Fig. 4 is a section on the line 4—4 of Fig. 3.

In the embodiment of the invention shown in Figs. 3 and 4, the pieces 6 and 7 of the strapping have their ends lapped, and a strip of material 8 is laid transversely of the lapped ends and the ends of the strip are bent around on the opposite faces of the ends to form a loop connecting the ends. Four welds 9 are made use of, so staggered and offset that they firmly connect the loop to the strapping ends throughout practically the full width of the strip and of the said ends.

Figure 5:
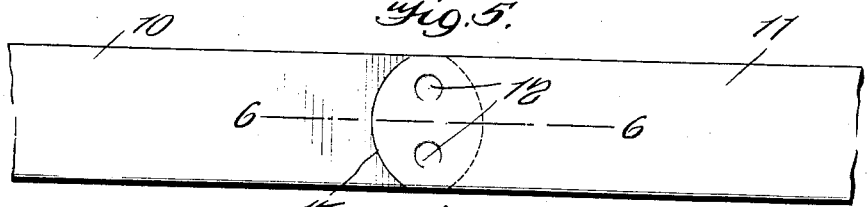
Fig. 5 is a plan view of another form.
Figure 6:
Fig. 6 is a section on the line 6—6 of Fig. 5.

In the embodiment of the invention shown in Figs. 5 and 6 the ends of the pieces 10 and 11 are lapped upon each other and spot welded at two points, as indicated at 12, the weld spots being arranged in line transversely of the pieces. It will be noticed, too, that the ends of the pieces are rounded, as indicated at 13, to prevent upturned corners.

Figure 7:
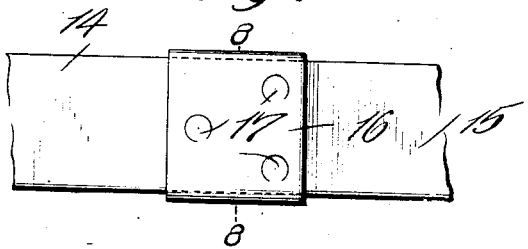
Fig. 7 is a plan view of another form.
Figure 8:
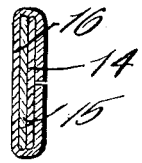
Fig. 8 is a section on the line 8—8 of Fig. 7.

In the embodiment of the invention shown in Figs. 7 and 8 the arrangement is practically the same as that of Figs. 3 and 4, the ends 14 and 15 of the pieces being connected by a loop 16 formed from a strip of strapping bent around the lapped ends. But three spots 17 of welding are used, however, two of the spots being in alinement transversely of the strip and the other being offset longitudinally of the strip from the first named two and between the two. It will be noticed that with either construction practically the full width of the pieces is connected.

With the improved joint, by arranging spot welds across the strapping, there is a greater area of resisting tensile pull, thereby increasing the tensile strength of the tie. Such arrangement also binds the edges together and prevents the corners from turning up with the resultant objectionable features.

The arrangement of the spots in series extending transversely of the strapping and with the series offset laterally and staggered gives added tensile strength, increasing the welded area to practically the entire width of the strapping with a minimum of lapping. In addition, this manner of welding eliminates the natural turning movement of short coupled lap under tensile stretch.

By binding or hooking the lap before the welding, as shown in Figs. 1, 3 and 7, there is a reinforcement of material, by reason of additional thickness, to give added strength to the joint. Each of these arrangements also eliminates all rough surfaces, sharp corners or joints which make the strap cumbersome in practical use or dangerous after, when on the bale. Because of the elimination of the cumbersome lapped surfaces the strap can be rolled, as in the case of new strapping.

I claim:

1. A method of welding pieces of bale ties, which consists in placing the ends of the piece upon each other in lapping relation, and in lapping a third piece about the lapped ends transversely of the tie, said third piece being above and below the lapped ends, and in connecting the said ends and the other piece by spot welding, the welding being arranged in series of spots extending transversely of the tie in a plurality of lines, the spots of one line being staggered with respect to the spots of the other lines.

2. A method of splicing pieces of bale ties, which consists in placing the ends of the pieces upon each other in lapping relation and in connecting the said end by spot welding, the welding being arranged in series of spots extending transversely of the ties in a plurality of lines, and the spots of one line being staggered with respect to the spots of the other line.

WADDY RANDOLPH THOMSON.

Witnesses:
NANNA PERRY,
JACK RODDEY.